US 7,058,974 B1

(12) United States Patent
Maher, III et al.

(10) Patent No.: US 7,058,974 B1
(45) Date of Patent: Jun. 6, 2006

(54) METHOD AND APPARATUS FOR PREVENTING DENIAL OF SERVICE ATTACKS

(75) Inventors: Robert Daniel Maher, III, Plano, TX (US); Victor A. Bennett, Rockwall, TX (US)

(73) Assignee: Netrake Corporation, Plano, TX (US)

( * ) Notice: Subject to any disclaimer, the term of this patent is extended or adjusted under 35 U.S.C. 154(b) by 1030 days.

(21) Appl. No.: 09/598,631

(22) Filed: Jun. 21, 2000

(51) Int. Cl.
G06F 11/00 (2006.01)
G06F 11/22 (2006.01)
G06F 11/30 (2006.01)
G06F 11/32 (2006.01)

(52) U.S. Cl. .......................... 726/13; 726/23; 713/189; 370/229

(58) Field of Classification Search ................ 713/201, 713/200, 154; 706/47; 370/474; 726/22, 726/23–26
See application file for complete search history.

(56) References Cited

U.S. PATENT DOCUMENTS

| 5,813,001 A | 9/1998 | Bennett | |
|---|---|---|---|
| 6,477,669 B1 * | 11/2002 | Agarwal et al. | 714/708 |
| 6,598,034 B1 * | 7/2003 | Kloth | 706/47 |
| 6,636,512 B1 * | 10/2003 | Lorrain et al. | 370/392 |
| 6,654,373 B1 * | 11/2003 | Maher et al. | 370/392 |
| 6,735,219 B1 * | 5/2004 | Clauberg | 370/474 |

* cited by examiner

Primary Examiner—Gilberto Barron, Jr.
Assistant Examiner—Samson Lemma
(74) Attorney, Agent, or Firm—Haynes and Boone, LLP (57) ABSTRACT

A method and apparatus for preventing denial of service type attacks on data networks is described. The method involves scanning the contents of the data packets flowing over the data network using a traffic flow scanning engine. The data packets are reordered and reassembled and then the payload contents are scanned to determine whether they conform to predetermined requirements. Data packets which do not reorder or reassemble correctly or which do not conform to the predetermined requirements may be dropped. Dropping packets which do not reorder or reassemble correctly or which do not conform to the predetermined requirements prevent denial of service attack which exploit bugs in the TCP/IP implementation or shortcomings in the TCP/IP specification The traffic flow scanning engine is further operable to determine whether the data packets are associated with validated traffic flows. Those data packets associated with validated traffic flows are assigned to a higher priority while those not associated with a validated traffic flow are assigned to a low priority, which may occupy no more that a predetermined maximum of the available bandwidth. Assigning data packets associated with a non-validated traffic flow to a low priority prevent brute force type denial of service attacks designed to clog networks.

16 Claims, 6 Drawing Sheets

METHOD AND APPARATUS FOR PREVENTING DENIAL OF SERVICE ATTACKS

TECHNICAL FIELD OF THE INVENTION

The present invention relates to broadband data networking equipment. Specifically, the present invention relates to a method and device that prevents denial of service type internet attacks.

BACKGROUND OF THE INVENTION

A "denial of service" (DoS) attack is characterized by an explicit attempt by attackers to prevent legitimate users of a service from using that service. DoS attacks are aimed at devices and networks with exposure to the Internet. Their goal is to cripple a device or network so that external users no longer have access to network resources. Without hacking password files or stealing sensitive data, a denial-of-service hacker simply fires up a program that will generate enough traffic to a particular site that it denies service to the site's legitimate users.

There are three types of DoS attacks: those that exploit a bug in a TCP/IP implementation, those that exploit a shortcoming in the TCP/IP specification, and brute-force attacks that clog up the network with so much useless traffic that no other traffic can get in or out.

Two lethal attacks, the well-known Ping of Death and the newer Teardrop attack, exploit known bugs in TCP/IP implementations. The Ping of Death uses a ping system utility to create an IP packet that exceeds the maximum 65,536 bytes of data allowed by the IP specification. The oversize packet is then sent to an unsuspecting system. Systems may crash, hang, or reboot when they receive such a maliciously crafted packet.

The recently developed Teardrop attack exploits weaknesses in the reassembly of IP packet fragments. During its journey through the Internet, an IP packet may be broken up into smaller chunks. Each fragment looks like the original IP packet except that it contains an offset field that says, for instance, "This fragment is carrying bytes 600 through 800 of the original (nonfragmented) IP packet." The Teardrop program creates a series of IP fragments with overlapping offset fields. When these fragments are reassembled at the destination host, some systems will crash, hang, or reboot.

Weaknesses in the TCP/IP specification leave hosts open to SYN attacks, executed during the three-way handshake that kicks off a TCP conversation between two applications. Under normal circumstances, the application that initiates a TCP session sends a TCP SYN synchronization packet to the receiving application. The receiver sends back a TCP SYN-ACK acknowledgment packet and then the initiator responds with an ACK acknowledgment. After this handshake, the applications are set to send and receive data.

But a SYN attack floods a targeted system with a series of TCP SYN packets. Each packet causes the targeted system to issue a SYN-ACK response. While the targeted system waits for the ACK that follows the SYN-ACK, it queues up all outstanding SYN-ACK responses on what is known as a backlog queue. This backlog queue has a finite length that is usually quite small. Once the queue is full, the system will either ignore all incoming SYN requests, or more likely crash. SYN-ACKs are moved off the queue only when an ACK comes back or when an internal timer (which is set at relatively long intervals) terminates the three-way handshake.

A SYN attack creates each SYN packet in the flood with a bad source IP address, which under routine procedure identifies the original packet. All responses are sent to the source IP address. But a bad source IP address either does not actually exist or is down; therefore the ACK that should follow a SYN-ACK response will never come back. This creates a backlog queue that's always full, making it nearly impossible for legitimate TCP SYN requests to get into the system.

In a Land attack—a simple hybrid of the SYN attack—hackers flood SYN packets into the network with a spoofed source IP address of the targeted system.

A lot more dangerous than any initiative launched by their cartoon namesakes, the Smurf attack is a brute-force attack targeted at a feature in the IP specification known as direct broadcast addressing. A Smurf hacker floods the router of the victim with Internet Control Message Protocol (ICMP) echo request packets (pings). Since the destination IP address of each packet is the broadcast address of the victim's network, the victim's router will broadcast the ICMP echo request packet to all hosts on its network. If the victim has numerous hosts, this will create a large amount of ICMP echo request and response traffic.

If a hacker chooses to spoof the source IP address of the ICMP echo request packet, the resulting ICMP traffic will not only clog up the primary victim's network—the "intermediary" network—but will also congest the network of the spoofed source IP address—known as the "secondary victim" network.

The User Datagram Protocol (UDP) Flood denial-of-service attack also links two unsuspecting systems. By spoofing, the UDP Flood attack hooks up one system's UDP chargen service, which for testing purposes generates a series of characters for each packet it receives, with another system's UDP echo service, which echoes any character it receives in an attempt to test network programs. As a result, a nonstop flood of useless data passes between the two systems.

Prevention of a UDP Flood, can be accomplished by either disabling all UDP services on each host in the network or by having a firewall filter all incoming UDP service requests. However, categorically denying all UDP traffic, you will rebuff legitimate applications, such as RealAudio, that use UDP as their transport mechanism.

Accordingly, what is needed is a method of preventing DoS attacks and a network device that can perform that method in order to prevent DoS attacks from disrupting entire networks.

SUMMARY OF THE INVENTION

The present invention provides for a method of preventing DoS attacks. The method involves scanning the contents of the data packets then verifying that the contents of the data packets conform to a set of predetermined requirements, the predetermined requirement including reordering and reassembling data packets according to a defined policy and insuring that they conform to required parameters such as packet length, non-overlapping offsets, and adherence to protocol standards. Data Packets that do not verify may be dropped.

After the contents have been verified, the data packets are checked to determine if they are associated with a validated traffic flow. If the data packet is associated with a validated traffic flow it is assigned to a higher priority quality of service for transmission back onto the network. If the data packet is not associated with a validated traffic flow it is assigned to a low priority quality of service queue, such that data packets in the low priority quality of service queue can occupy no more that a predetermined maximum of the available network bandwidth when they are transmitted back onto the network.

The present invention also includes a network device for preventing DoS attacks. The network device includes a traffic flow scanning engine and a quality of service processor. The traffic flow scanning engine is operable to scan the contents of the data packets, including the header and the payload, and to associate the data packets with particular traffic flows. The traffic flow scanning engine is also operable to determine whether each traffic flow is a validated or non-validated. Further, the traffic flow scanning engine reorders and reassembles the data packets and associated traffic flows and insures that the data packets conform to predetermined requirements. The network device may drop packets that do not reorder or reassemble correctly or which do not conform to the predetermined requirements. Once the traffic flow scanning engine has scanned the data packet it produces a conclusion associated with that data packet, both of which are passed to the quality of service processor.

The quality of service processor uses the conclusion from the traffic flow scanning engine to place the data packets in the appropriate quality of service queue. Data packets associated with validated traffic flow are placed in higher priority queues and transmitted back onto the network according to the protocol for the particular queue. Data packets not assigned to a validated traffic flow are placed in low priority QoS queue. Data packets in the low priority QoS queue are transmitted onto the network such that they occupy no more than a predetermined maximum of available bandwidth, thereby preventing flood type DoS attacks.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1A:
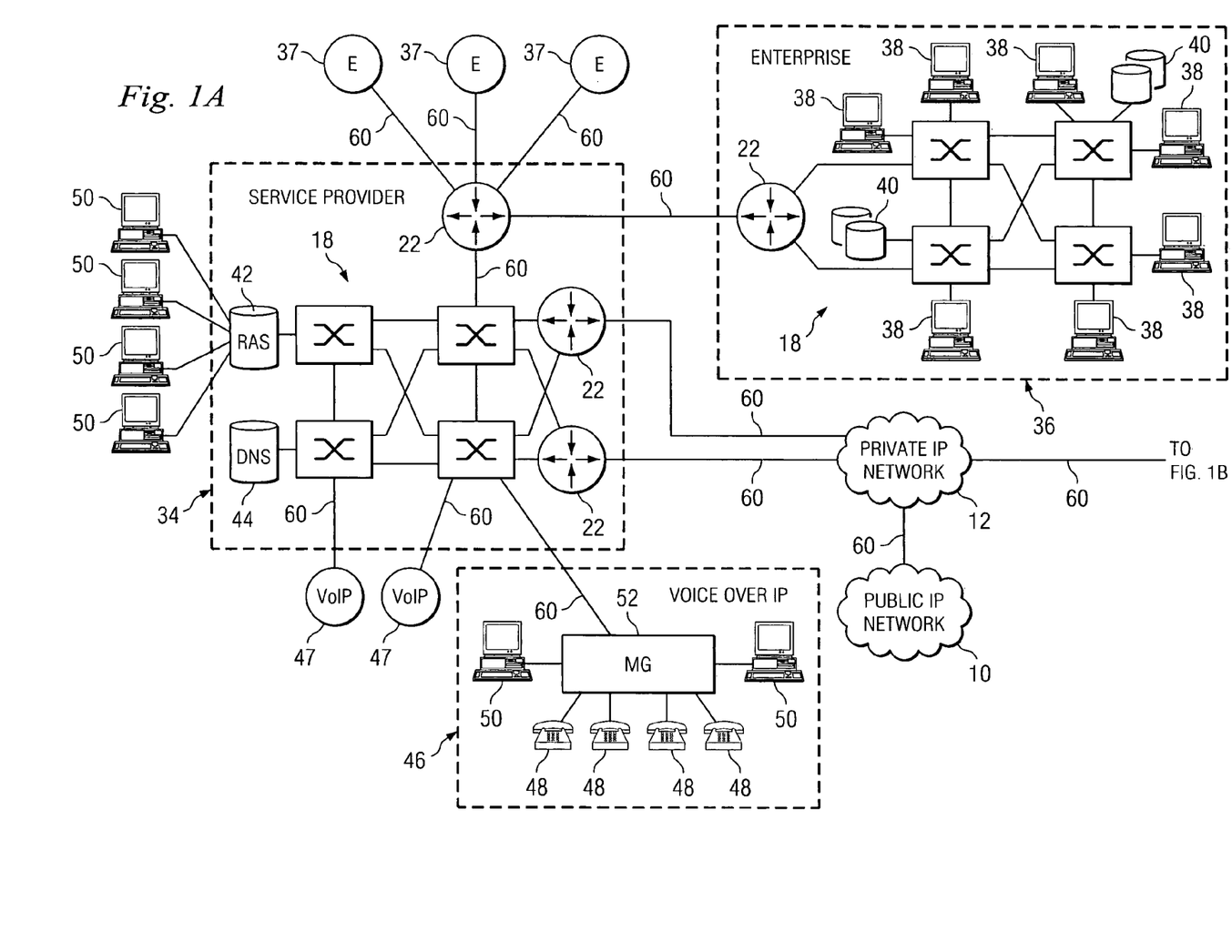
FIGS. 1a and 1b is a network topology diagram illustrating example environments in which the present invention can operate.
Figure 1B:
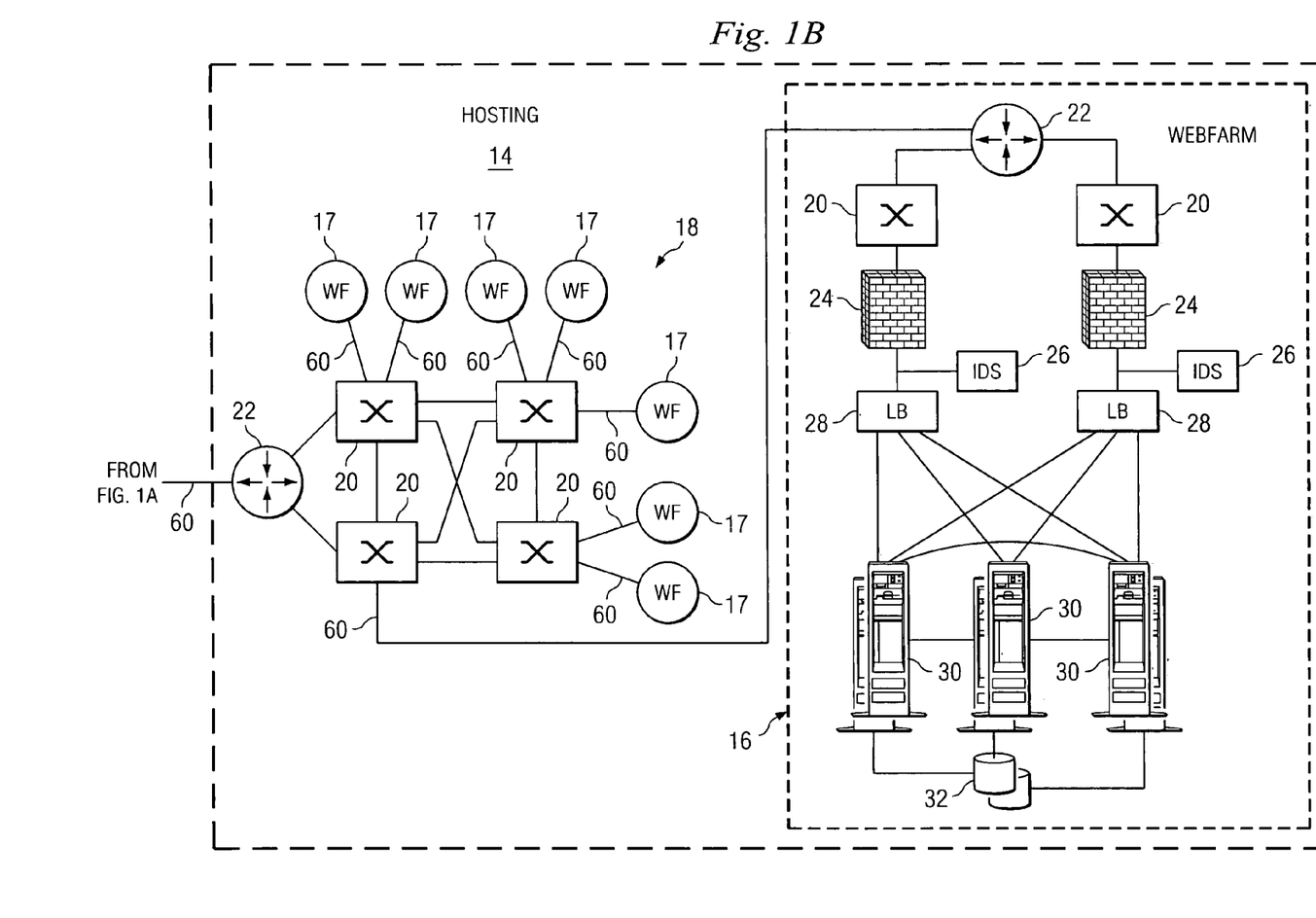

Referring now to FIGS. 1a and 1b, a network topology is shown which is an example of several network infrastructures that connect in some manner to a broader public IP network 10 such as the internet. FIGS. 1a and 1b is in no way meant to be a precise network architecture, but only to serve as a rough illustration of a variety of network structures which can exist on a broadband IP network. Public IP network 10 can be accessed in a variety of ways. FIGS. 1a and 1b shows the public IP network being accessed through a private IP network 12 which can be the IP network of a company such as MCI or UUNET which provide private core networks. An endless variety of network structures can be connected to private IP network 12 in order to access other networks connected to private IP network 12 or to access public IP network 10.

One example of a network structure connecting to private IP network 12 is hosting network 14. Hosting network 14 is an example of a network structure that provides hosting services for internet websites. These hosting services can be in the form of webfarm 16. Webfarm 16 begins with webservers 30 and database 32 which contain the webpages, programs and databases associated with a particular website such as amazon.com or yahoo.com. Webservers 30 connect to redundant load balancers 28 which receive incoming internet traffic and assign it to a particular webserver to balance the loads across all of webservers 30. Redundant intrusion detection systems 26 and firewalls connect to load balancers 28 and provide security for webfarm 16. Individual webfarms 16 and 17 connect to hosting network 14's switched backbone 18 by means of a network of switches 20 and routers 22. Hosting network 14's switched backbone 18 is itself made up of a network of switches 20 which then connect to one or more routers 22 to connect to private IP network 12. Connections between individual webfarms 16 and 17 and the switched backbone 18 of hosting network 14 are usually made at speeds such as OC-3 or OC-12 (approx. 150 megabits/sec or 625 megabits/sec), while the connection from router 22 of hosting network 14 to private IP network 12 are on the order OC-48 speeds (approx. 2.5 gigabits/sec).

Another example of network structures connecting to private IP network are illustrated with service provider network 34. Service provider network 34 is an example of a network structure for Internet Service Providers (ISPs) or Local Exchange Carriers (LECs) to provide both data and voice access to private IP network 12 and public IP network 10. Service provider network 34 provides services such as internet and intranet access for enterprise networks 36 and 37. Enterprise networks 36 and 37 are, for example, company networks such as the company network for Lucent Technologies or Merril Lynch. Each enterprise network, such as enterprise network 36, includes a plurality of network servers and individual workstations connected to a switched backbone 18, which can be connected by routers 22 to service provider network 34.

In addition to internet access for enterprise networks, service provider network 34 provides dial-up internet access for individuals or small businesses. Dial-up access is provided in service provider network 34 by remote access server (RAS) 42, which allows personal computers (PCs) to call into service provider network 34 through the public switched telephone network (PSTN), not shown. Once a connection has been made between the PC 50 and RAS 42 through the PSTN, PC 50 can then access the private or public IP networks 12 and 10.

Service provider network 34 also provides the ability to use the internet to provide voice calls over a data network referred to as Voice over IP (VoIP). VoIP networks 46 and 47 allow IP phones 48 and PCs 50 equipped with the proper software to make telephone calls to other phones, or PCs connected to the internet or even to regular phones connected to the PSTN. VoIP networks, such as VoIP network 46, include media gateways 52 and other equipment, not shown, to collect and concentrate the VoIP calls which are sent through service provider network 34 and private and public internet 12 and 10 as required. As mentioned, the advent of VoIP as well as other real time services such as video over the internet make quality of service a priority for service providers in order to match the traditional telephone service provided by traditional telephone companies.

Service provider network 34 includes a switched backbone 18 formed by switches 20 as well as routers 22 between it and its end users and between it and private IP network 12. Domain name servers 44 and other networking equipment, which are not shown, are also included in service provider network 34. Similar to hosting network 34, connection speeds for service provider network 34 can range from speeds such as T1, T3, OC-3 and OC-12 for connecting to enterprise networks 36 and 37 as well as VoIP networks 46 and 47 all the way to OC-48 and conceivably even OC-192 for connections to the private IP network.

It can easily be seen that aggregation points 60 exist at the edges of these various network structures where data is passed from one network structure to another at speeds such as OC-3, OC-12, and OC-48. One major problem in the network structures shown in FIG. 1 is the lack on any type of intelligence at these aggregation points 60 which would allow the network to provide services such as security, metering and quality of service. The intelligence to provide these services would require that the network understand the type of data passing through the aggregation points 60 and not just the destination and/or source information which is currently all that is understood. Understanding the type of data, or its contents, including the contents of the associated payloads as well as header information, and further understanding and maintaining a state awareness across each individual traffic flow would allow the network to configure itself in real time to bandwidth requirements on the network for applications such as VoIP or video where quality of service is a fundamental requirement. An intelligent, or "content aware", network would also be able to identify and filter out security problems such as email worms, viruses, denial of service (DoS) attacks, and illegal hacking in a manner that would be transparent to end users. Further, a content aware network would provide for metering capabilities by hosting companies and service providers, allowing these companies to regulate the amount of bandwidth allotted to individual customers as well as to charge precisely for bandwidth and additional features such as security.

In accordance with the requirements set forth above, the present invention provides for a network device that is able to scan, classify, and modify network traffic including payload information at speeds of OC-3, OC-12, OC-48 and greater thereby providing a "content aware" network capable of preventing denial of service attacks on the network.

Figure 2:
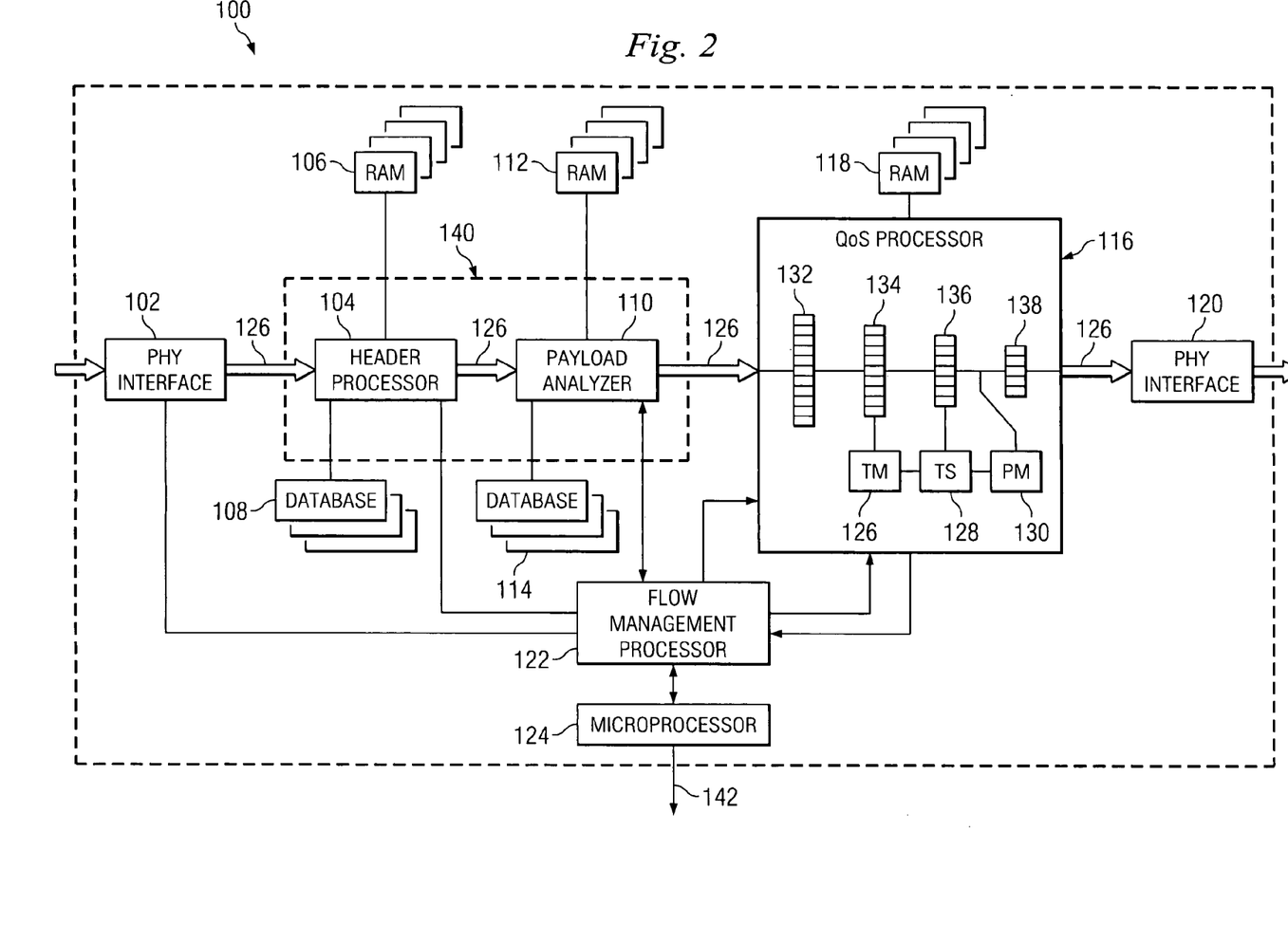
FIG. 2 is a block diagram of a "bump-in-the-line" network apparatus according to the present invention.

Referring now to FIG. 2, one embodiment of a network apparatus according to the present invention is shown. Network apparatus 100, as shown, acts as a "bump-in-the-line" type device by accepting data received from a high-speed network line, processing the data, and then placing the data back on the line. Network apparatus 100 accepts data from the line by means of input physical interface 102. Input physical interface 102 can consist of a plurality of ports, and can accept any number of network speeds and protocols, including such high speeds as OC-3, OC-12, OC-48, and protocols including 10/100 Ethernet, gigabit Ethernet, and SONET. Input physical interface 102 takes the data from the physical ports, frames the data, and then formats the data for placement on fast-path data bus 126 which is preferably an industry standard data bus such as a POS-PHY Level 3, or an ATM UTOPIA Level 3 type data bus.

Fast-path data bus 126 feeds the data to traffic flow scanning processor 140, which includes header processor 104 and payload analyzer 110. The data is first sent to header processor 104, which is operable to perform several operations using information contained in the data packet headers. Header processor 104 stores the received data packets in packet storage memory 106 and scans the header information. The header information is scanned to identify the type, or protocol, of the data packet, which is used to determine routing information as well as to create a session id using predetermined attributes of the data packet.

In the preferred embodiment, a session id is created using session information consisting of the source address, destination address, source port, destination port and protocol, although one skilled in the art would understand that a session id could be created using any subset of fields listed or any additional fields in the data packet without departing from the scope of the present invention. When a data packet is received that has new session information the header processor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header processor 104 the session id can be created anywhere in traffic flow scanning engine 140 including in payload analyzer 110.

As will be discussed below, network apparatus 100 in order to function properly needs to reorder out of order data packets and reassemble data packet fragments. Header processor 104 is operable to perform the assembly of asynchronous transfer mode (ATM) cells into complete data packets (PDUs), which could include the stripping of ATM header information.

Header processor 104 is also operable to perform routing functions. Routing tables and information can be stored in database memory 108. Routing instructions received by network apparatus 100 are identified, recorded and passed to microprocessor 124 by header processor 104 so that microprocessor 124 is able to update the routing tables in database memory 108 accordingly. While network apparatus 100 is referred to as a "bump-in-the-line" apparatus, The input and the output could be formed by multiple lines, for example four OC-12 lines could be connected to network apparatus 100 which operates at OC-48 speeds. In such a case, "bump-in-the-line" network apparatus 100 will have limited routing or switching capabilities between the multiple lines, although the switching capability will be less than in a conventional router or switch. Additionally, a network apparatus can be constructed according to the principles of the present invention, which is able to operate as a network router or switch. Such an implementation is discussed in greater detail with reference to FIG. 4.

After data packets have been processed by header processor 104 the data packets, their associated session id and any conclusion formed by the header processor, such as routing or QoS information, are sent on fast-data path 126 to the other half of traffic flow scanning engine 140, payload analyzer 110. The received packets are stored in packet storage memory 112 while they are processed by payload analyzer 110. Payload analyzer 110 is operable to scan the contents of data packets received from header processor 104, particularly the payload contents of the data packets, although header information can also be scanned as required. The contents of any or all data packets are compared to a database of known signatures and if the contents of a data packet or packets matches a known signature, an action associated with that signature and/or session id can be taken by network apparatus 100. Additionally, payload analyzer 110 is operable to maintain state awareness throughout each individual traffic flow. In other words, payload analyzer 110 maintains a database for each session which stores state information related to not only the current data packets from a traffic flow, but state information related to the entirety of the traffic flow. This allows network apparatus 100 to act on not only based on the content of the data packets being scanned but also based on the contents of the entire traffic flow. The specific operation of payload analyzer 110 will be described with reference to FIG. 3.

Once the contents of the packets have been scanned and a conclusion reached by traffic flow scanning engine 140, the packets and the associated conclusions of either or both the header processor and the payload analyzer are sent to quality of service (QoS) processor 116. QoS processor 116 again stores the packets in its own packet storage memory 118 for forwarding. QoS processor 116 is operable to perform the traffic flow management for the stream of data packets processed by network apparatus 100. QoS processor contains engines for traffic management 126, traffic shaping 128 and packet modification 130.

QoS processor 116 takes the conclusion of either or both of header processor 104 and payload analyzer 110 and assigns the data packet to one of its internal quality of service queues 132 based on the conclusion. The quality of service queues 132 can be assigned priority relative to one another or can be assigned a maximum or minimum percentage of the traffic flow through the device. This allows QoS processor to assign the necessary bandwidth to traffic flows such as VoIP, video and other flows with high quality and reliability requirements while assigning remaining bandwidth to traffic flows with low quality requirements such as email and general web surfing to low priority queues. Information in queues that do not have the available bandwidth to transmit all the data currently residing in the queue according to the QoS engine is selectively discarded thereby removing that data from the traffic flow.

The quality of service queues 132 also allow network apparatus 100 to manage network attacks such as denial of service (DoS) attacks. Network apparatus 100 can act to qualify traffic flows by scanning the contents of the packets and verifying that the contents contain valid network traffic between known sources and destinations. Traffic flows that have not been verified because they are from unknown sources or because they are new unclassified flows can be assigned to a low quality of service queue until the sources are verified or the traffic flow classified as valid traffic. Since most DoS attacks send either new session information, data from spoofed sources, or meaningless data, network apparatus 100 would assign those traffic flows to low quality traffic queues. This ensures that the DoS traffic would receive no more that a small percentage (i.e. 5%) of the available bandwidth thereby preventing the attacker from flooding downstream network equipment.

The QoS queues 132 in QoS processor 116 (there are 65 k queues in the present embodiment of the QoS processor although any number of queues could be used) feed into schedulers 134 (1024 in the present embodiment), which feed into logic ports 136 (256 in the present embodiment), which send the data to flow control port managers 138 (32 is the present embodiment) which can correspond to physical egress ports for the network device. The traffic management engine 126 and the traffic shaping engine 128 determine the operation of the schedulers and logic ports in order to maintain traffic flow in accordance with the programmed parameters.

QoS processor 116 also includes packet modification engine 130, which is operable to modify, add, or delete bits in any of the fields of a data packet. This allows QoS processor 116 to change addresses for routing or to place the appropriate headers on the data packets for the required protocol. The packet modification engine 130 can also be used to change information within the payload itself if necessary. Data packets are then sent along fast-data path 126 to output PHY interface 120 where it is converted back into an analog or optical signal and placed on the network.

As with all network equipment, a certain amount of network traffic will not be able to be processed along fast-data path 126. This traffic will need to be processed by on board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through network apparatus 100. In addition to processing odd, or missing packets, microprocessor 124 also controls the user management interface 142 and recompiles databases 108 and 114 to accommodate new signatures and can be used to learn and unlearn sessions identified by the traffic flow scanning engine 140.

The abilities of network apparatus 100 are unique in a number of respects. Network apparatus 100 has the ability to scan the contents of any data packet or packets for any information that can be represented as a signature or series of signatures. The signatures can be of any arbitrary length, can begin and end anywhere within the packets and can cross packet boundaries. Further, network apparatus 100 is able to maintain state awareness throughout all of the individual traffic flow by storing state information for each traffic flow representing any or all signatures matched during the course of that traffic flow. Existing network devices operate by looking for fixed length information at a precise point within each data packet and cannot look across packet boundaries. By only being able to look at fixed length information at precise points in a packet, existing network equipment is limited to acting on information contained at an identifiable location within some level of the packet headers and cannot look into the payload of a data packet much less make decisions on state information for the entire traffic flow or even on the contents of the data packet including the payload.

Figure 3:
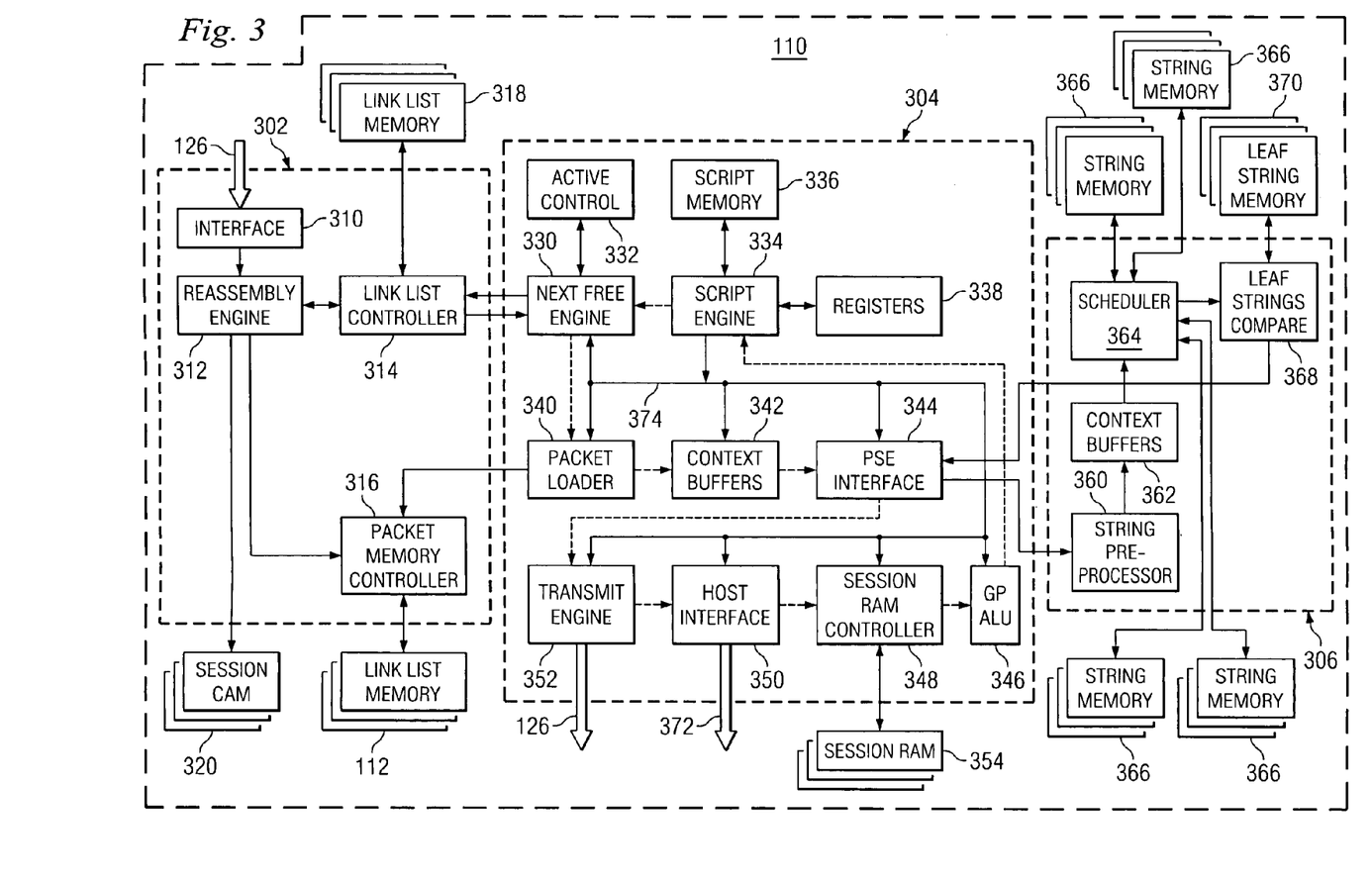
FIG. 3 is a block diagram of the payload scanning engine from FIG. 2.

Referring now to FIG. 3, the payload analyzer 110 of FIG. 2 is described in greater detail. As described above payload analyzer 110 is operable to scan the contents of data packets forwarded from header processor 104 from FIG. 2. Payload analyzer 110 includes three separate engines, queue engine 302, context engine 304, and payload scanning engine 306.

Since payload analyzer 110 scans the contents of the payload, and is able to scan across packet boundaries, payload analyzer 110 must be able reassemble fragmented packets and reorder out of order packets on a per session basis. Reordering and reassembling is the function of queue engine 302. Queue engine 302 receives data off the fast-path data bus 126 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. Session CAM 320 can store the session id generated by queue engine 302 of payload analyzer 110. Reordering and reassembly engine 312 uses the session id to link data packets belonging to the same data flow.

In order to obtain the high throughput speeds required, payload analyzer 110 must be able to process packets from multiple sessions simultaneously. Payload analyzer 110 processes blocks of data from multiple data packets each belonging to a unique traffic flow having an associated session id. In the preferred embodiment of the present invention, payload analyzer 110 processes 64 byte blocks of 64 different data packets from unique traffic flows simultaneously. Each of the 64 byte blocks of the 64 different data flows represents a single context for the payload analyzer. The scheduling and management of all the simultaneous contexts for payload analyzer 110 is handled by context engine 304.

Context engine 304 works with queue engine 302 to select a new context when a context has finished processing and been transmitted out of payload analyzer 110. Next free context/next free block engine 330 communicates with link list controller 314 to identify the next block of a data packet to process. Since payload analyzer 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified packet loader 340 uses the link list information retrieved by the next free context/next free block engine to retrieve the required block of data from packet memory 112 using packet memory controller 316. The new data block is then loaded into a free buffer from context buffers 342 where it waits to be retrieved by payload scanning engine interface 344.

Payload scanning engine interface 344 is the interface between context engine 304 and payload scanning engine 306. When payload scanning engine 306 has room for a new context to be scanned, payload scanning engine interface 344 sends a new context to string preprocessor 360 in payload scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by scheduler 364. Scheduler controls the input and output to signature memory 366. While four signature memories 366, each of which is potentially capable of handling multiple contexts, are shown any number could be used to increase or decrease the throughput through payload scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memory 370 to perform a bit to bit comparison of the context and the potentially matched string.

The conclusion of the payload scanning are then sent back to the payload scanning interface 344 along with possibly a request for new data to be scanned. The conclusion of the payload scanning can be any of a number of possible conclusions. The scanning may not have reached a conclusion yet and may need additional data from a new data packet to continue scanning in which case the state of the traffic flow and any incomplete scans are stored in session memory 354 along with other appropriate information such as sequence numbers, counters etc. The conclusion reached by signature memory 366 may also be that scanning is complete and there is or isn't a match, in which case the data packet and the conclusion are sent to transmit engine 352 for passing to QoS processor 116 from FIG. 2. The scanning could also determine that the data packet needs to be forwarded to microprocessor 124 from FIG. 2 for further processing, so that the data packet is sent to host interface 350 and placed on host interface bus 372. In addition to handling odd packets, host interface bus 350 allows microprocessor 124 to control any aspect of the operation of payload analyzer 110 by letting microprocessor 124 write to any buffer or register in context engine 304.

State information is stored in session memory 354 and is updated as necessary after data associated with the particular traffic flow is scanned. The state information for each traffic flow represents the content awareness of network apparatus 100 from FIG. 2, and allows network apparatus to act not only on the information scanned, but also on all the information that has been scanned for each traffic flow.

The operation of transmit engine 352, host interface 350, session memory controller 348, which controls the use of session memory 354, and of general-purpose arithmetic logic unit (GP ALU) 346, which is used to increment or decrement counter, move pointers, etc., is controlled by script engine 334. Script engine 334 operates to execute programmable scripts stored in script memory 336 using registers 338 as necessary. Script engine 334 uses control bus 374 to send instruction to any of elements in context engine 304.

As can be seen from the description of FIG. 3, payload analyzer 110 allows the entire contents of any or all data packets received by a network device to be scanned against a database of known signatures. The scanned contents can be any variable or arbitrary length and can even cross packet boundaries. The abilities of payload analyzer 110 allow the construction of a network device that is content aware which gives the network device the ability to operate on data packets based on the content of that data packet as has already been described herein.

Figure 4:
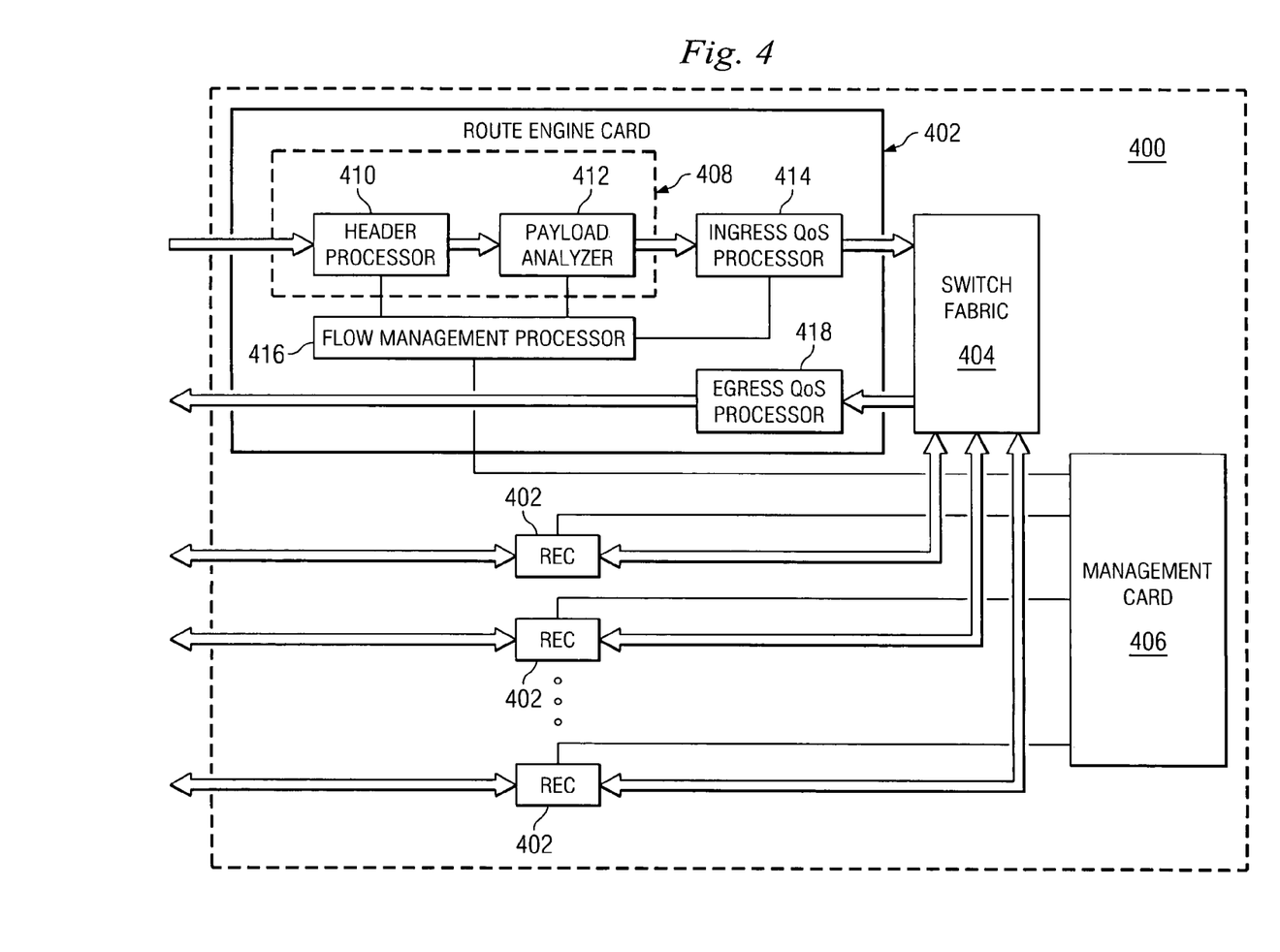
FIG. 4 is a block diagram of a routing network apparatus according to the present invention.

Referring now to FIG. 4 an embodiment of the network apparatus of the present invention with routing capabilities is described. Routing network apparatus 400 is formed by two or more route engine cards 402 connected to switch fabric 404. One or more management cards 406 are also included to provide a user interface and to manage route engine cards 402. Each of route engine cards 402 operate fundamentally as described with respect to network apparatus 100 of FIG. 2. Traffic flow scanning engine 408, formed by header processor 410 and payload analyzer 412, scans the contents of the data packets and generates a conclusion based on the contents. The packets and associated conclusions are forwarded to ingress QoS processor 414, which assigns the packets to a QoS queue. The data packets are then sent to the switch fabric, which forwards the data packets to the proper route engine card 402 for it's assigned output port. The data packet then flows through the egress QoS processor 418, which schedules the traffic received from all the route engine cards 402 for transmission onto the network. The microprocessor 124 shown in FIG. 2 could be present on the route engine card 402 or could potentially be moved to the management card 406 to allow one microprocessor to support multiple route engine cards 402. Each of the route engine cards 402 could even have its own microprocessor with an additional microprocessor on management card 406.

Having multiple route engine cards with multiple ingress and egress paths allows routing network apparatus to function as a routing network device, as opposed to the single ingress and egress path of the "bump-in-the-line" device described with respect to FIG. 2. This allows the routing functions of header processor 410 to be utilized in routing network apparatus 400.

Figure 5:
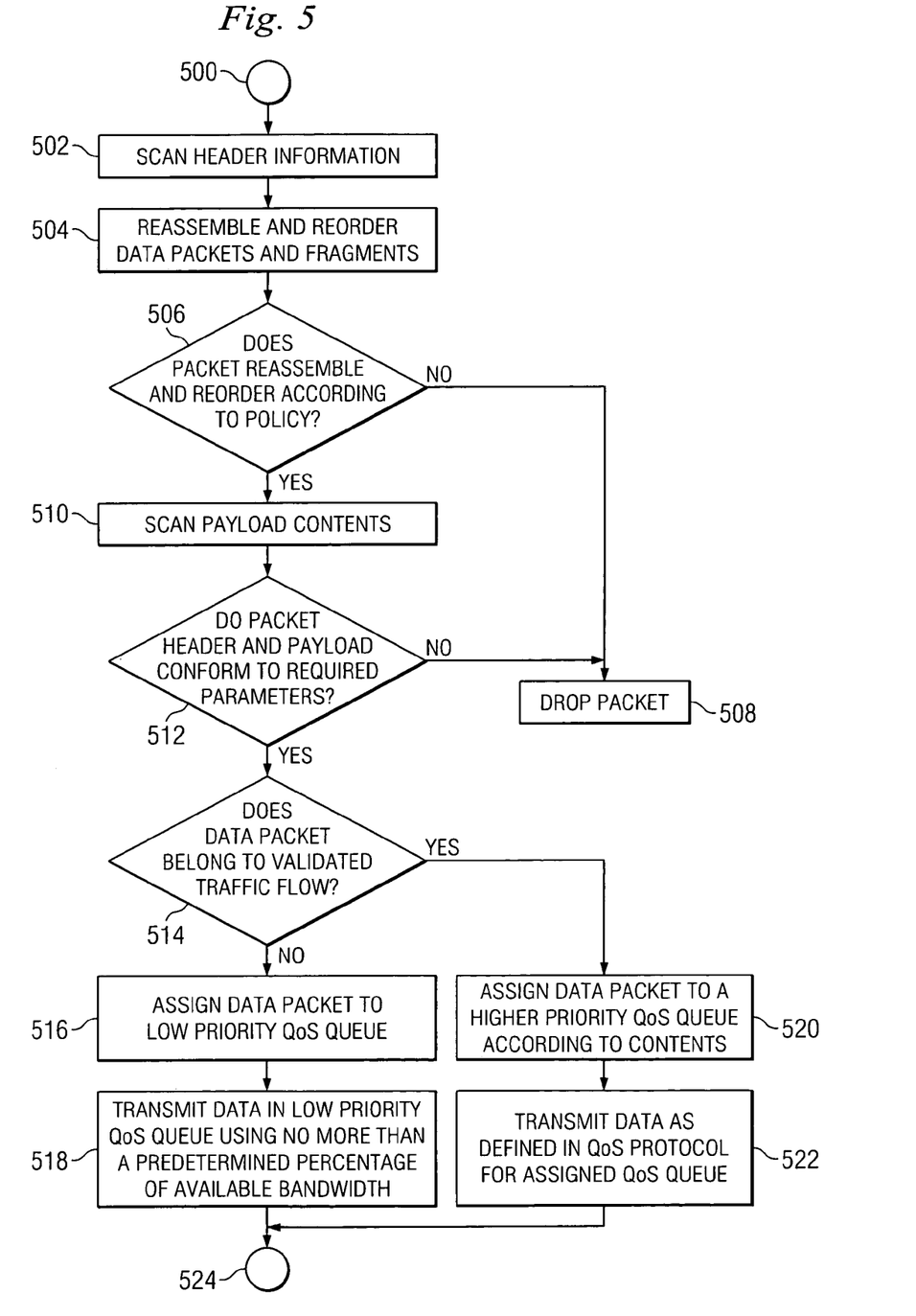
FIG. 5 is a flow chart illustrating a method according to the present invention for preventing denial of service attacks.

Referring now to FIG. 5, a method of preventing denial of service attacks according to the present invention is shown. The method begins at start block 500 and proceeds to block 502, which scans the header information of the data packets. The method then passes to block 504 where the data packets are reassembled and reordered to create an ordered flow of complete data packets. During reorder and reassembly, block 506 determines whether the data packets reorder and reassemble correctly. If they do not reorder or reassemble correctly, such as with a teardrop type attack, the packet or packets are dropped as shown with block 508, thereby preventing the attack from reaching its destination. The dropping of data packets can be accomplished by flagging the data packet to be dropped immediately or at some point in the future, for example by the QoS processor 116 from FIG. 2.

If the blocks do reorder and reassemble correctly the method passes to block 510, which scans the payload contents of the data packets. During the scanning of the payload contents, the method determines whether the data conforms to enforced protocols such as length, structure, proper context within the data, etc. If the data does not conform to enforced protocols, such as exceeding maximum packet length with a Ping of Death type attack, the packet is also dropped as shown by block 508.

Data packets which reorder and reassemble correctly and which contain data that conforms to enforced protocols are then checked to see if they are part of a validated traffic flow. As described above with reference to FIGS. 2 and 3, each individual traffic flow is identified and assigned a session id. After scanning a particular traffic flow over enough data packets to determine the nature of the traffic flow the traffic flow is classified, or in other words assigned a quality of service level and either validated as an appropriate traffic flow or left non-validated. The classification of the traffic flow is dynamic and can change over the course of the traffic flow as more information about the traffic flow is learned from scanning. The classification is part of the state of the traffic flow stored in session memory 354 from FIG. 3.

Block 514 shows the determination of whether the data packet belongs to a validated traffic flow. If the packet does belong to a validated traffic flow, it is assigned to a higher priority QoS queue based on the nature of the traffic flow, shown in block 520. The data packet is then transmitted onto the network as defined by the QoS protocol for the QoS queue to which it was assigned, as shown by block 522. Block 524 then represents the end of the present method.

If the packet does not belong to a validated traffic flow, such as with a Smurf or SYN flood where valid sessions are never established, it is assigned to a low priority QoS queue, as shown in block 516. The traffic management and traffic shaping engines 126 and 126 of QoS processor 116 from FIG. 2 can be programmed to insure that the low priority QoS queues are only allowed a predetermined percentage of the available bandwidth. This insures that the non-validated data packets cannot consume more than a small portion of the overall traffic flowing through network apparatus 100 as shown in block 518. By limiting the amount of bandwidth available to brute force attacks, such as the SYN flood attack or Smurf attacks, the attack is never allowed to consume enough network bandwidth to overwhelm the network.

FIG. 5 shows how the present invention can use its awareness of the contents of data packets and associated traffic flows, including keeping state over each traffic flow, to prevent DoS type attacks. Network apparatus 100 from FIG. 2 is able to either drop nonconforming data packets or to prevent flood type attacks from consuming all available bandwidth by understanding the nature of the data passing through it.

While the header processor, the QoS processors, and the flow management processor described with reference to FIGS. 2 and 4 can be any suitable processor capable of executing the described functions, in the preferred embodiment the header processor is the Fast Pattern Processor (FPP), the QoS processor is the Routing Switch Processor (RSP), and the flow management processor is the ASI processor, all manufactured by the Agere Division of Lucent Technologies, Austin Tex. Similarly the switch fabric may be any suitable switch fabric as is well known in the industry, including those manufactured by Power X Networks, Inc., 2833 Junction Ave., Suite 110, San Jose, Calif. The microprocessor described with reference to FIGS. 2 and 4 could be any suitable microprocessor including the PowerPC line of microprocessors from Motorola, Inc., or the x86 or Pentium line of microprocessors available from Intel Corporation. Although particular references have been made to specific protocols, implementations and materials, those skilled in the art should understand that the network apparatus, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A method for preventing denial of service attacks over a data network including a plurality of traffic flows each formed by a plurality of data packets, the method comprising:

scanning the contents of the data packets;

verifying that the data packets conform to a set of predetermined requirements;

checking if the data packet is associated with a validated traffic flow; and placing the data packet in a higher priority quality of service if the data packet is associated with a validated traffic flow and to a low priority quality of service if it is not associated with a validated traffic flow.

2. The method of claim 1 wherein verifying includes insuring that the data packets reorder and reassemble according to a defined policy and insuring that the data packets conform to required parameters.

3. The method of claim 1 further comprising between verifying and checking:
dropping the data packet if it does not conform to the set of predetermined requirements.

4. The method of claim 3 wherein scanning includes scanning of the data packet's header information and scanning the data packet's payload contents.

5. The method of claim 1 wherein the predetermined requirements include packet length, non-overlapping offset fields, and adherence to protocol standards.

6. The method of claim 5 wherein the validated traffic flows are identified by a state associated with each traffic flow.

7. A method of preventing denial of service attacks on a data network which includes a plurality of traffic flows each formed by multiple data packets having header and payload information, the method using a network device comprising a traffic flow scanning engine and a quality of service processor having a low priority queue and higher priority queues, the method comprising:
scanning the header information using the traffic flow scanning engine;
reordering and reassembling the data packets using the traffic flow scanning engine;
flagging data packets that do not reorder or reassemble correctly to be dropped;
scanning the payload contents using the traffic flow scanning engine;
determining whether the data packets conform to a set of predetermined requirements;
flagging data packets that do not conform to be dropped;
checking if the data packets are associated with a validated traffic flow; and
assigning data packets to a higher priority quality of service if the data packet is associated with a validated traffic flow and to a low priority quality of service if the data packet is not associated with a validated traffic flow.

8. The network device of claim 7 wherein the set of predetermined requirements include packet length, non-overlapping offset fields, and adherence to protocol standards.

9. The method of claim 7 wherein flagged data packets are dropped by the traffic flow scanning engine.

10. The method of claim 7 wherein flagged data packets are dropped by the quality of service processor.

11. The method of claim 7 wherein the validated traffic flows are identified by a state associated with each traffic flow.

12. A network device for preventing denial of service attacks on a data network which includes a plurality of traffic flows each formed by multiple data packets having contents including header information and payload information, the network device comprising:
a traffic flow scanning engine operable to scan the header and payload information of the data packets, to associate each data packet with a particular traffic flow and to determine whether each traffic flow is a validated traffic flow or a non-validated traffic flow, wherein the traffic flow scanning engine is further operable to reorder and reassemble the data packets and to verify that the data packet conforms to predetermined requirements such that the traffic flow scanning engine produces a conclusion associated with each data packet; and
a quality of service processor connected to the traffic flow scanning engine and operable to place the data packets into a quality of service queue from a plurality of quality of service queues based on the conclusion from the traffic flow scanning engine, wherein data packets from non-validated traffic flows are assigned to a low priority queue and data packets from validated traffic flow are assigned to a higher priority queue based on its contents.

13. The network device of claim 12 wherein the low priority queue is assigned a maximum percentage of network bandwidth.

14. The network device of claim 12 wherein data packets that do not reorder or reassemble correctly and data packets that do not conform to the predetermined requirements are dropped by the network device.

15. The network apparatus of claim 12 wherein the traffic flows are identified by a state associated with each traffic flow, the state representing whether the traffic flow is validated or non-validated.

16. The network apparatus of claim 12 wherein the set of predetermined requirements include packet length, non-overlapping offset fields, and adherence to protocol standards.

* * * * *